United States Patent
Wong (10) Patent No.: US 9,026,811 B2
(45) Date of Patent: May 5, 2015

(54) PORTABLE POWER BANK DEVICE WITH PROJECTING FUNCTION CAPABLE OF CHARGING AN EXTERNAL DEVICE AND DISPLAYING DATA FROM THE EXTERNAL DEVICE

(71) Applicant: Gigastone Corporation, Taipei (TW)

(72) Inventor: John Wong, Taipei (TW)

(73) Assignee: Gigastone Corporation, Taipei (TW)

( * ) Notice: Subject to any disclaimer, the term of this patent is extended or adjusted under 35 U.S.C. 154(b) by 0 days.

(21) Appl. No.: 13/861,903

(22) Filed: Apr. 12, 2013

(65) Prior Publication Data

US 2014/0013128 A1   Jan. 9, 2014

(30) Foreign Application Priority Data

Jul. 5, 2012   (TW) .............................. 101213030 U (51) Int. Cl.
*G06F 1/26* (2006.01)
*G06F 1/00* (2006.01)
*G06F 1/16* (2006.01)

(52) U.S. Cl.
CPC ................ *G06F 1/26* (2013.01); *G06F 1/1632* (2013.01); *G06F 1/1639* (2013.01); *G06F 1/266* (2013.01)

(58) Field of Classification Search
CPC ........................................................ G06F 1/26
USPC .......................................................... 713/300
See application file for complete search history.

(56) References Cited

U.S. PATENT DOCUMENTS

| | | | |
|---|---|---|---|
| 2006/0277420 A1* | 12/2006 | Nguyen ......................... | 713/300 |
| 2008/0051195 A1* | 2/2008 | Hedrick et al. ................. | 463/29 |
| 2009/0179610 A1* | 7/2009 | Lin ................................ | 320/101 |
| 2010/0058087 A1* | 3/2010 | Borras et al. .................. | 713/322 |
| 2010/0191947 A1* | 7/2010 | Shin ................................ | 713/2 |
| 2010/0321647 A1* | 12/2010 | Schuler et al. ................ | 353/121 |
| 2011/0055747 A1* | 3/2011 | Hua et al. ...................... | 715/771 |
| 2011/0074338 A1* | 3/2011 | Wu ................................ | 320/103 |
| 2012/0032531 A1* | 2/2012 | Cheng ........................... | 307/150 |
| 2012/0153891 A1* | 6/2012 | Yang et al. .................... | 320/107 |
| 2013/0194495 A1* | 8/2013 | Pan ............................... | 348/515 |

* cited by examiner

*Primary Examiner* — Thomas Lee
*Assistant Examiner* — Robert Cassity
(74) *Attorney, Agent, or Firm* — C. G. Mersereau; Nikolai & Mersereau, P.A.

(57) ABSTRACT

A portable power bank device with a projecting function comprises a battery unit, a control unit, and a micro projector unit. The battery unit is electrically coupled to a charge unit and restores power from an external power source. The control unit is electrically coupled to the charge unit and a connection interface unit, respectively. The control unit comprises a charge module, a voltage conversion module, and a video codec. A battery power source of the battery unit is outputted through the voltage conversion module. The micro projector unit is electrically coupled to the control unit and projects and displays video signals of the video codec.

14 Claims, 11 Drawing Sheets

PORTABLE POWER BANK DEVICE WITH PROJECTING FUNCTION CAPABLE OF CHARGING AN EXTERNAL DEVICE AND DISPLAYING DATA FROM THE EXTERNAL DEVICE

BACKGROUND OF THE INVENTION

1. Field of the Invention

The present invention relates to a portable power bank device and in particular to a portable power bank device which is easy to carry and can supply power to other electronic devices anytime.

2. Description of Prior Art

As for current various portable electronic products such as smart phones and tablet computers, due to more and more emphases on the fast and humanization design applications, the products are designed with many high-end processors and sensing elements. These elements consume lots of power energy during operation, in which the power supplement becomes required There are two types of charging currently for electronic products. One is to use a transmission line connected directly to the electronic products to charge the internal batteries thereof; another is to take the batteries out of the electronic products first and then use a battery charger to charge the batteries. Both are transforming the voltage of the mains into a specific voltage level by means of the charger to charge the battery. However, for an outdoor user, when the power of these electronic products is exhausted, the charging power supply is not available anytime. Further, for the closed system electronic products such as an iphone or an ipad, the batteries can not be taken out for charging, which is not convenient to charge using a transmission line.

Furthermore, for such portable electronic products such as smart phones or tablet computers, equipped with a generally small screen, if many persons want to check the contents on the screen at the same time, it appears to be too crowded. The invention of mini-projectors, or called micro projectors, could solve the above problem. The currently available micro projector can be installed in the smart phone or an independent micro projector can be connected to the smart phone and then displays the images of the smart phone on the large external screen.

However, such a smart phone or a micro projector suffers from high power consumption and can not operate for a long time.

SUMMARY OF THE INVENTION

The primary objective of the present invention is to provide a portable power bank device which supplements power to electronic devices and has a projecting function to project and display the video signals of the electronic devices.

Another objective of the present invention is to provide a portable power bank device which has an audio output to output the audio signals of electronic devices and has a projecting function.

Another yet objective of the present invention is to provide a portable power bank device which produces a 3D sound effect output and has a projecting function.

Another yet objective of the present invention is to provide a portable power bank device which performs bi-direction audio transmission with a portable communication device and has a projecting function.

Another yet objective of the present invention is to provide a portable power bank device which uses a wireless connection to access data in a storage unit and has a projecting function.

Another yet objective of the present invention is to provide a portable power bank device which can accommodate an extractable wireless head set, used as a phone set of a Bluetooth head set when extracted, replaced as a Bluetooth phone unit when inserted and not operated, and has a projecting function.

Another yet objective of the present invention is to provide a portable power bank device which can be inserted by and connected to a memory card and has a projecting function. To achieve the above objectives, the present invention provides a portable power bank device with a projecting function, comprising: a battery unit electrically coupled to a charge unit and restoring power from an external power source; a control unit electrically coupled to the charge unit and a connection interface unit, respectively, the control unit comprising a charge module, a voltage conversion module, and a video codec, wherein the battery unit outputs a battery power source through the voltage conversion module; and a micro projector unit electrically coupled to the control unit and projecting and displaying video signals of the video codec, wherein the connection interface unit comprises a USB interface, HDMI interface, an AV out interface, and a TV out interface;

wherein the voltage conversion module which is used for conversion of a source voltage comprises an overload protection submodule avoiding an excessive transmission current and a detection submodule detecting a voltage current of the electronic equipment.

The present invention further provides a portable power bank device with the projecting function, the control unit further comprising a first wireless communication module having an AP submodule and a client submodule. The device has a wireless communication unit electrically coupled to the control unit.

The wireless communication unit receives a wireless signal which may be the signal of Bluetooth, Hyper LAN, Triple Play, GSM/GPRS, 3G, 3.5G, 4G, IEEE802.11, IEEE802.3, IEEE802.15, or Wi-Fi Direct.

The wireless communication unit has an antenna and is a communication unit of WIFI, 3G, 4G, or Bluetooth communication unit.

The present invention further provides a portable power bank device with the projecting function, the control unit further comprising an audio codec including a 3D sound effect submodule and an audio output unit connected to the audio codec of the control unit. The audio output unit includes an amplifying element and a speaker element.

By means of the portable power bank device with the projecting function of the present invention, not only can the power be supplemented to the electronic device, but the screen data of the electronic device can be projected and displayed. Also, an audio input unit or a wireless head set is provided to be connected to the portable power bank device via the wireless signal.

The above objectives of the present invention and the features regarding the structure and function and the present invention will be explained according to the preferred embodiments in the accompanying figures.

DETAILED DESCRIPTION OF THE INVENTION

The First Preferred Embodiment

Figure 1A:
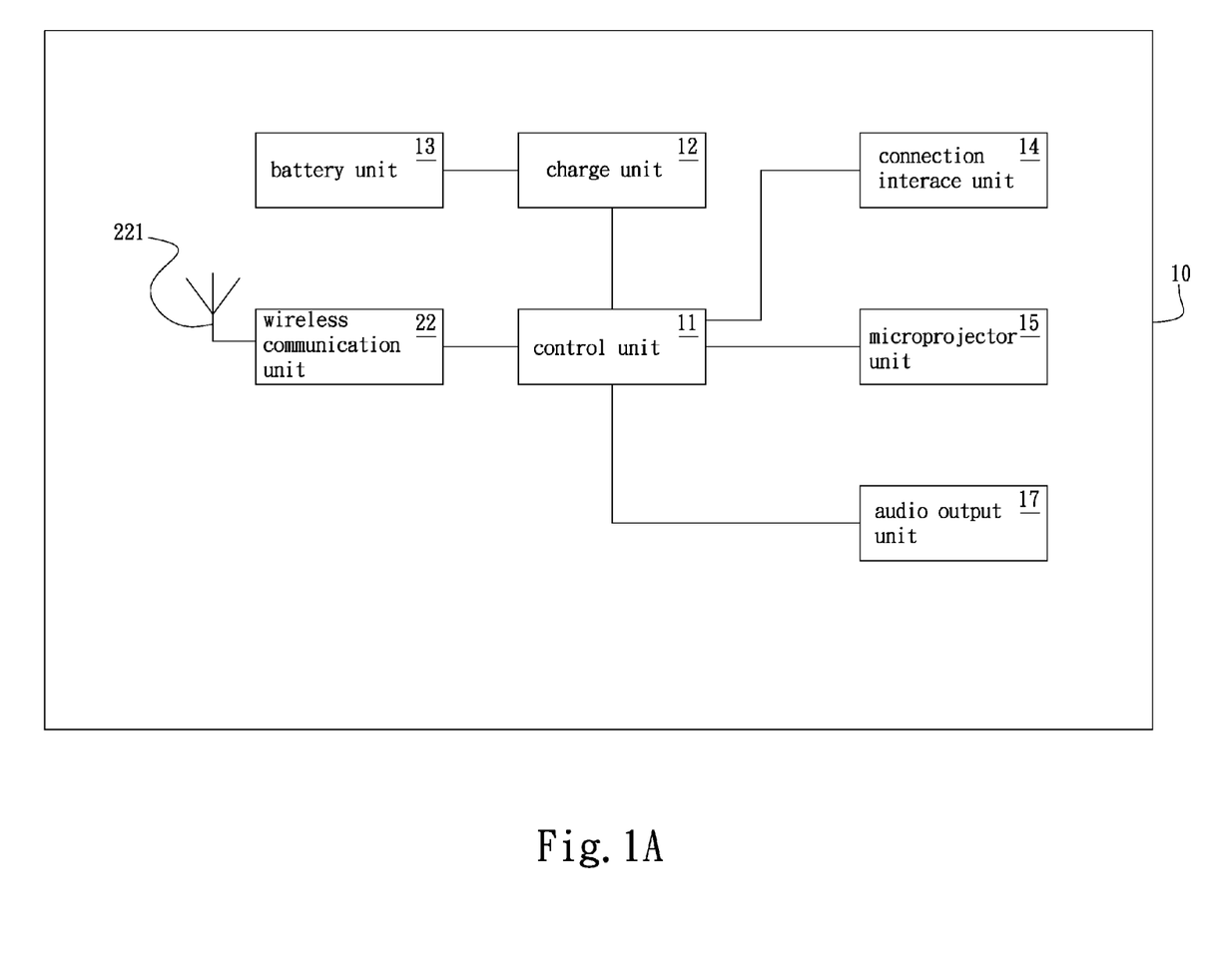
FIG. 1A is a schematic block diagram according to the first preferred embodiment of the present invention.

Please refer to FIG. 1A, which is a schematic block diagram of the portable power bank device with the projecting function according to the first preferred embodiment of the present invention. As shown in FIG. 1A, the device 10 comprises a control unit 11 electrically coupled to a charge unit 12, a connection interface unit 14, a micro projector unit 15, a wireless communication unit 22, and an audio output unit 17, respectively. The charge unit 12 is electrically coupled to a battery unit 13.

The above-mentioned connection interface unit 14 is, for example (but not limited to), a USB interface (suitable for the transmission protocol of USB 1.0, USB 2.0, or USB 3.0), an HDMI interface, an AV out interface, or a TV out interface. The connection interface unit 14 is connected to an external power source ($V_{out}$), a computer, or a portable electronic device, such as an iphone, or an ipad, to receive audio/video signals.

The battery unit 13 receives the external power source ($V_{out}$) to restore power and outputs the restored power to a battery power source ($V_{bat}$). The voltage output of the battery power source is, for example (but not limited to), from DC 3.6 V to DC 4V. The portable electronic device can obtain the battery power source through the connection interface unit 14. The battery unit 13 may be, for example (but not limited to), a lithium-ion battery, a lithium iron battery, a lead acid battery or a Li/MnO$_2$ battery.

The charge unit 12 can receive the external power source and output to the battery unit 13 to charge the battery unit 13. Additionally, when the battery unit 13 is fully charged, the charge unit 12 will send a signal to inform the control unit 11. Also, the control unit 11 obtains the battery power source ($V_{bat}$) of the battery unit 13 through the charge unit 12. The micro projector unit 15, the audio output unit 17 and the wireless communication unit 22 obtains the battery power source ($V_{bat}$) of the battery unit 13 through the control unit 11. The charge unit 12 is, for example (but not limited to), a charge circuit.

The wireless communication unit 22 is electrically coupled to the control unit 11 and has an antenna 221 receiving a wireless signal, in which the wireless communication unit 22 is a communication unit of, for example (but not limited to), WIFI, 3G (or 4G), or Bluetooth. The wireless signal is, for example (but not limited to), the signal of Bluetooth, Hyper LAN, Triple Play, GSM/GPRS, 3.5G, 4G, IEEE802.11, IEEE802.3, IEEE802.15, or Wi-Fi Direct.

Figure 1B:
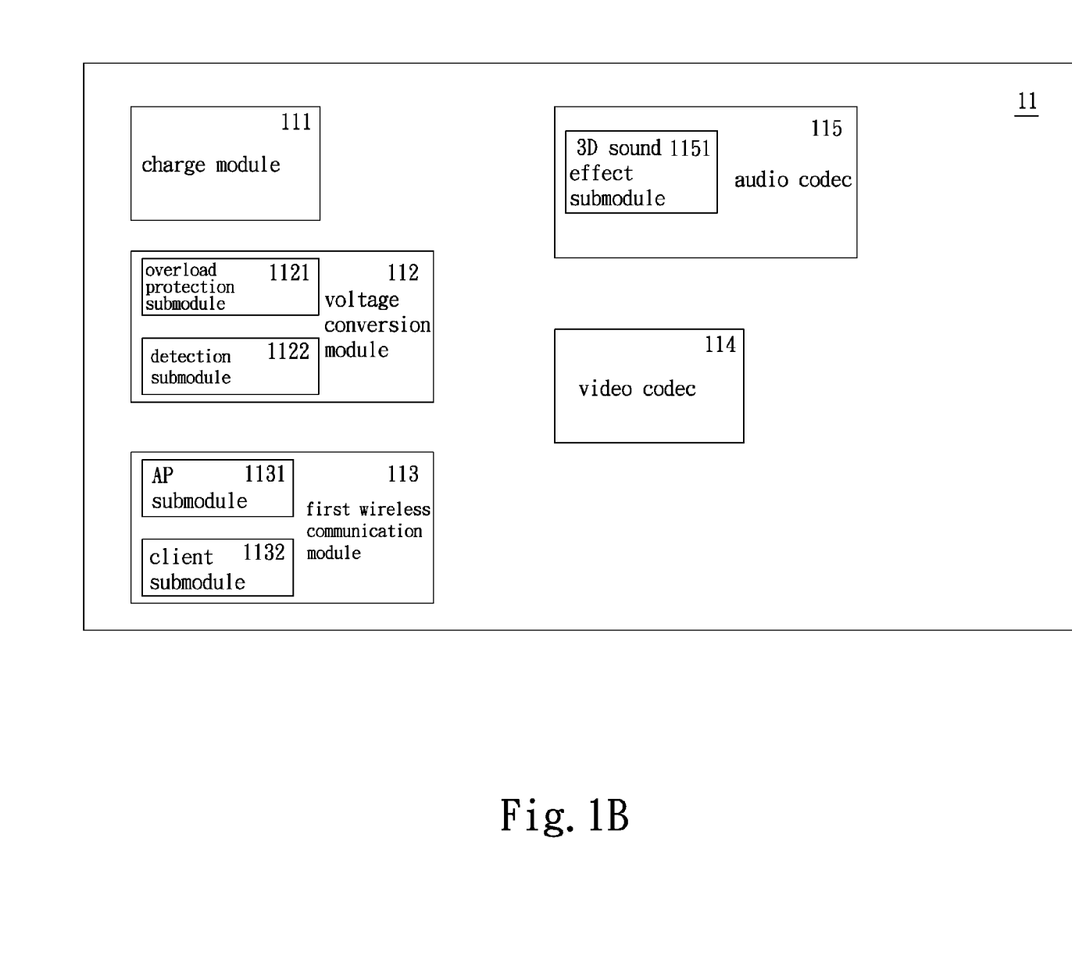
FIG. 1B is a schematic block diagram of the control unit according to the first preferred embodiment.

As shown in FIG. 1B, the control unit 11 comprises a charge module 111, a voltage conversion module 112, a first wireless communication module 113, a video codec 114, and an audio codec 115.

The charge module 111 is used for charge control of the battery unit 13 to prevent overcharge of the battery unit 13. When the external power source is inputted, the charge module 111 of the control unit 11 begins to control the charging of the battery unit 13. When the battery unit 13 is fully charged, the charge module 111 of the control unit 11 stops the external power source from charging the battery unit 13.

The voltage conversion module 112 is used to convert the inputted external source voltage and convert the outputted battery power source voltage of the battery unit 13. The voltage conversion module 112 comprises an overload protection submodule 1121 avoiding an excessive transmission current and a detection submodule 1122 detecting a voltage current of an electronic device connected to the connection interface unit 14. If the electronic device is at a low-voltage level, it will be charged. The voltage conversion module 112 is, for example (but not limited to), a voltage conversion circuit.

The first wireless communication module 113 is electrically connected to the wireless communication unit 22. The first wireless communication module 113 has an AP (Access Point) submodule 1131 and a client submodule 1132. In AP submodule 1131 mode, the portable power bank device 10 of the present invention can be used as a wireless AP; in client submodule 1132 mode, the portable power bank device 10 of the present invention can be used as a client to access other wireless APs.

The video codec 114 encodes/decodes the video signals of the video and audio data from the connection interface unit 14, and then transmits the encoded/decoded video signals to the micro projector unit 15. The format of the video signals is, for example (but not limited to), AVI, MP4, RMB, WMA, MKV, Divx, Xvid, MPEG-2, or MPEG-4.

The audio codec 115 encodes/decodes the audio signals of the video and audio data from the connection interface unit 14, and then transmits the encoded/decoded audio signals to the audio output unit 17. The format of the audio signals is, for example (but not limited to), MP3, AC3, AAC, ADPCM, ATRAC, DTS, MP2, Musepack, Ogg Vorbis, or WMA.

The audio codec 115 includes a 3D sound effect submodule 1151 transforms the encoded/decoded audio signals into 3D sound effect signals which are outputted to the audio output unit 17.

The micro projector unit 15 transforms the above-mentioned encoded/decoded video signals into the images and then outputs and projects the images. The micro projector unit 15 comprises a backlight source, a light engine, a projection size adjustment mechanism, and a focus adjustment mechanism.

Figure 1C:
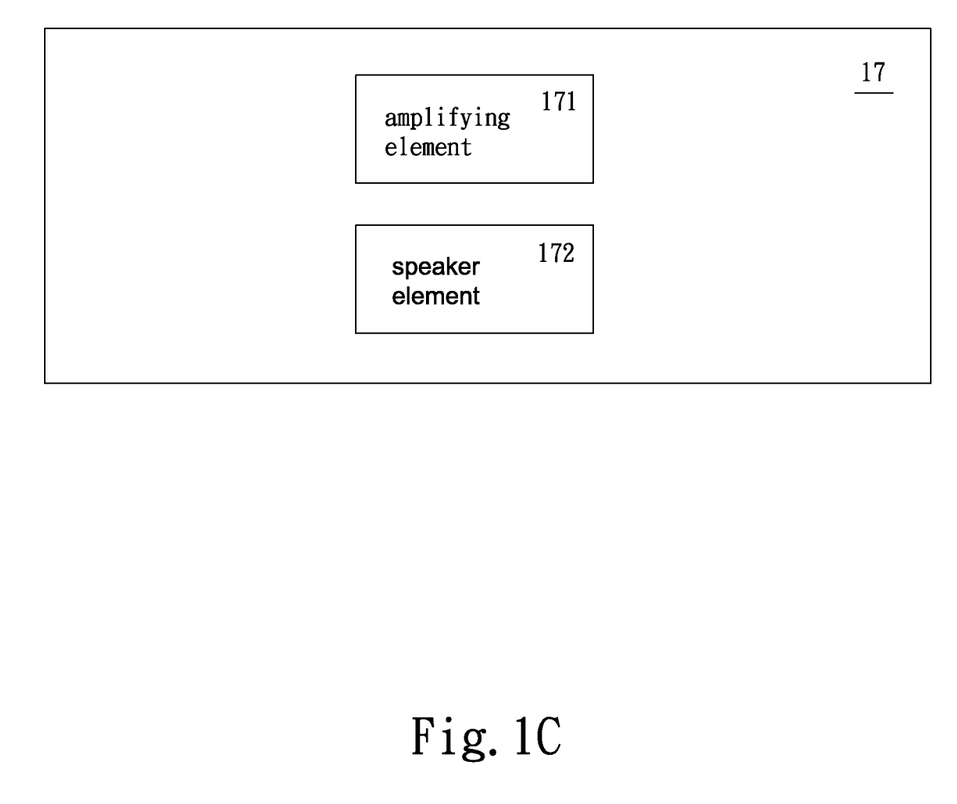
FIG. 1C is a schematic block diagram of the audio output unit according to the first preferred embodiment.

As shown in FIG. 1C, the audio output unit 17 outputs the above-mentioned encoded/decoded audio signals. The audio output unit 17 includes an amplifying element 171 and a speaker element 172. The audio signals are transmitted through the amplifying element 171 and then broadcast from the speaker element 172.

Figure 1D:
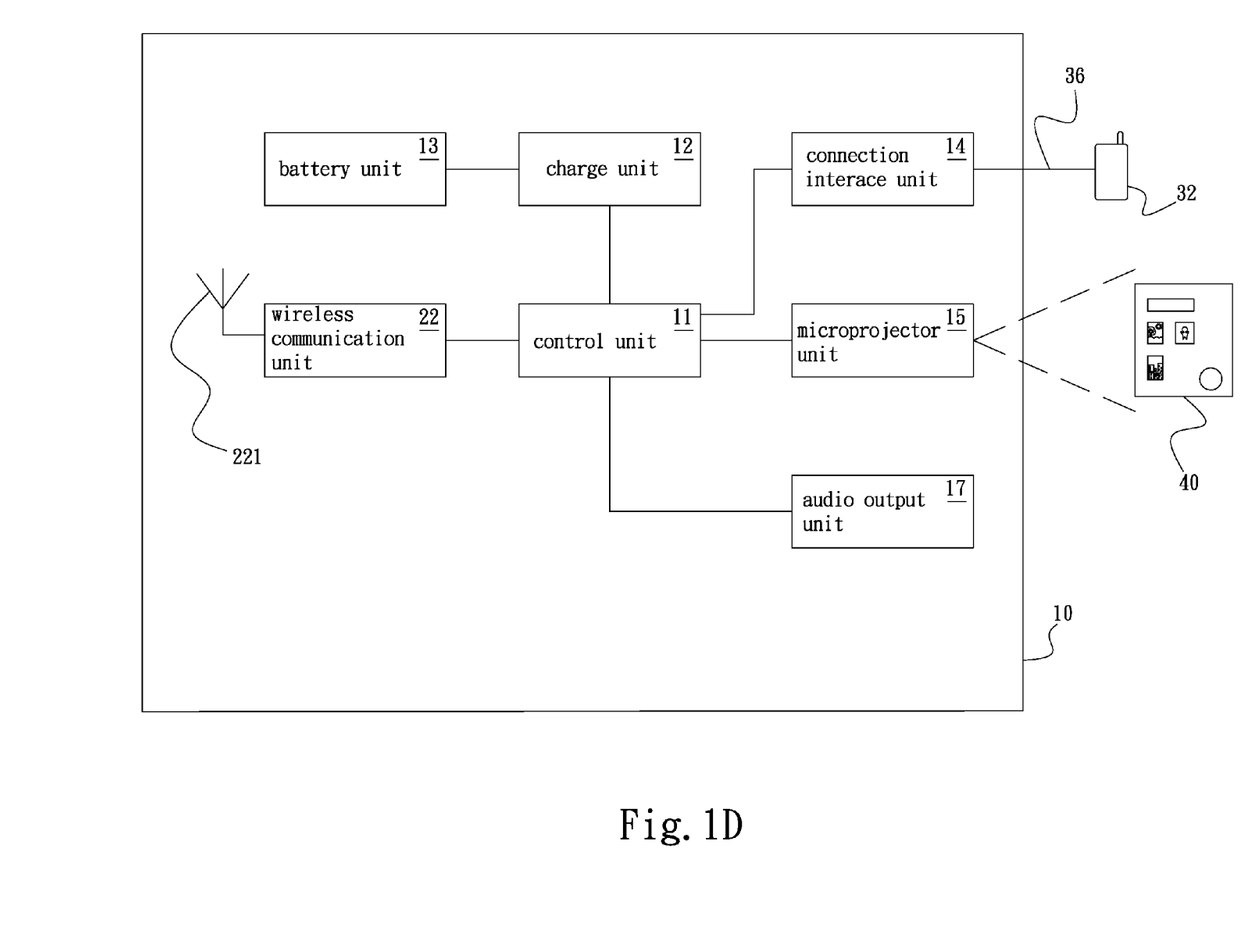
FIG. 1D is an operational schematic according to the first preferred embodiment.

Please refer to FIG. 1D, which is an operational schematic according to the first preferred embodiment. A portable device 32, such as an iphone or an Android cell phone, is connected to the connection interface unit 14. The connection method is, for example, to connect the interface port (not shown) of the portable device 32, such as the USB interface port, HDMI interface port, AV out interface port, or TV out interface port, directly to the connection interface unit 14. Alternatively, the interface port (not shown) of the portable device 32 can be connected to the connection interface unit 14 through a data line 36, as shown in FIG. 1D. The portable device 32 not only obtains the battery power source of the portable power bank device 10 through the connection interface unit 14, but also projects a large size image 40 (e.g. 40-50 inches) of the interface screen or stored data (e.g., text files, figures, video files, or other digital media contents) of portable device 32 transmitted through the connection interface unit 14 onto a large screen via the micro projector unit.

In addition, if the data of the portable device 32 is audio data, it can be broadcast from the speaker element 172.

The Second Preferred Embodiment

Figure 2:
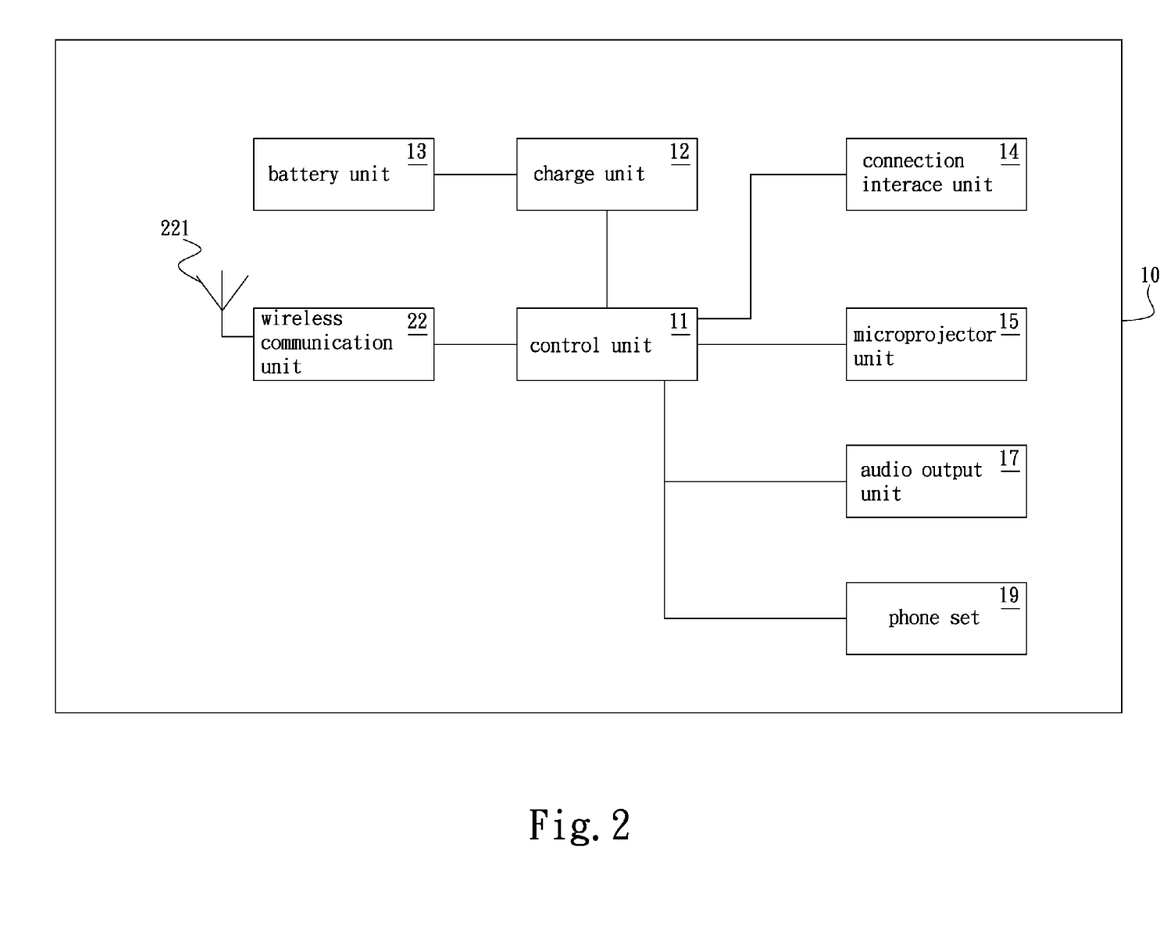
FIG. 2 is a schematic block diagram according to the second preferred embodiment of the present invention.

Please refer to FIG. 2, which is a schematic block diagram of the portable power bank device with a projecting function according to the second preferred embodiment of the present invention. As shown in FIG. 2, some structures of the current embodiment are the same as those of the above-mentioned first embodiment and will not be described again. The difference between the current embodiment and the above-mentioned first embodiment is that in the current embodiment the portable power bank device 10 further comprises a phone set 19 electrically connected to the control unit 11 and further electrically connected to the audio codec 115. The phone set 19 obtains the battery power source through the control unit 11.

The portable power bank device 10 of the present invention establishes a wireless communication channel, for example a Bluetooth communication channel, with a portable communication device, such as an iphone or an Android cell phone, through the wireless communication unit 22 to transmit an audio message. When the portable communication device is in use, it transmits the incoming message using the Bluetooth communication channel through the antenna 221 of the wireless communication unit 22 to the first wireless communication module 113 of the control unit 11 and then to the phone set 19. Also, the audio message to be sent is transmitted through the phone set 19, the first wireless communication module 113, the antenna 221 of the wireless communication unit 22, to the portable communication device such that the audio message received by the portable communication device can be transmitted to the phone set 19 to perform bi-direction audio transmission.

The Third Embodiment

Figure 3A:
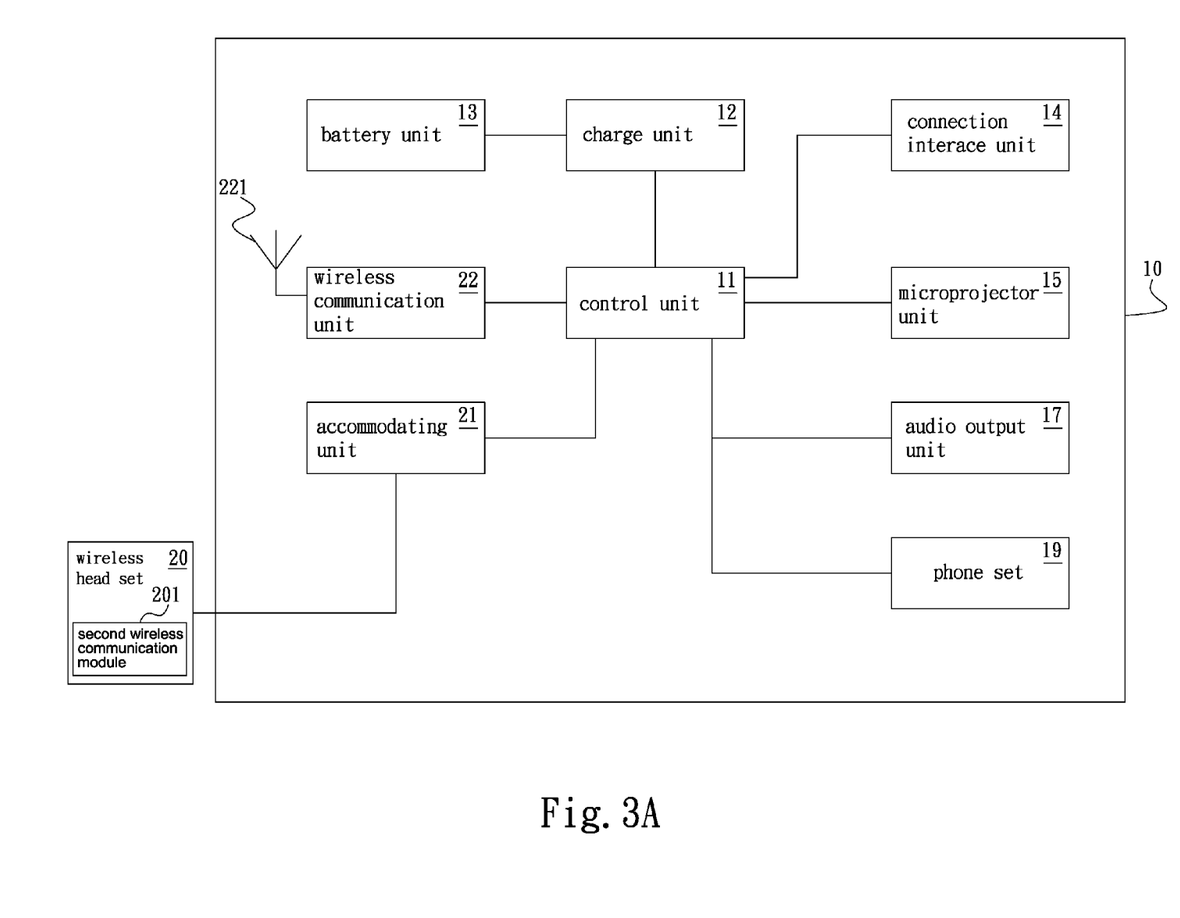
FIG. 3A is a schematic block diagram according to the third preferred embodiment of the present invention.

Pleaser refer to FIG. 3A, which is a schematic block diagram of the portable power bank device with a projecting function according to the third preferred embodiment of the present invention. As shown in FIG. 3A, some structures of the current embodiment are the same as those of the above-mentioned first embodiment and will not be described again. The difference between the current embodiment and the above-mentioned first embodiment is that in the current embodiment the portable power bank device 10 further comprises an accommodating unit 21 electrically connected to the control unit 11 and a wireless head set (e.g., a Bluetooth head set) 20 which may be accommodated in the accommodating unit 21. The wireless head set 20 has a second wireless communication module 201 to transmit/receive a wireless signal. The accommodating unit 21 is provided with electrical terminals and the wireless head set 20 is also provided with electrical terminals corresponding to the electrical terminals of the accommodating unit 21.

The wireless head set 20 in a feasible embodiment can be extracted from the accommodating unit 21 of the portable power bank device 10 to be used as a phone set of a Bluetooth head set and be replaced to the accommodating unit 21 as a Bluetooth phone unit when inserted and not operated. By means of the electrical connection between the electrical terminals of the accommodating unit 21 and the electrical terminals of the wireless head set 20, the battery power source of the battery unit 13 can charge the wireless head set 20 through the control unit 11.

Figure 3B:
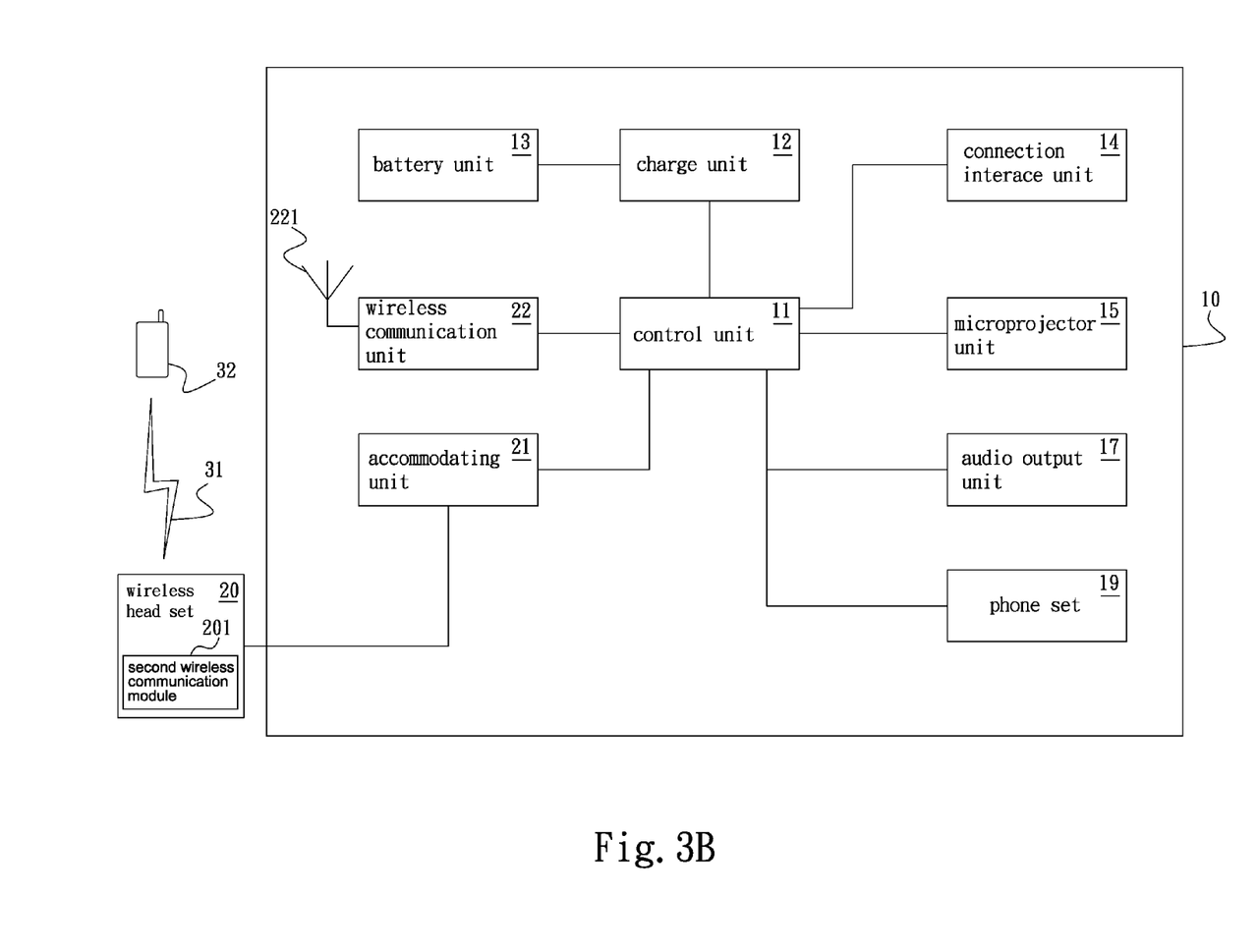
FIG. 3B is an operational schematic according to the third preferred embodiment of the present invention.

Please refer to FIG. 3B, which is an operational schematic according to the third preferred embodiment of the present invention. A portable device 32, such as an iphone or an Android cell phone, uses a wireless signal 31 to establish a wireless communication channel, for example a Bluetooth communication channel through the second wireless communication module 201 with the wireless head set 20 in a wireless connection state to transmit an audio message. When the portable communication device 32 is in use, it communicates the incoming message with the wireless head set 20 using the Bluetooth communication channel through the second wireless communication module 201. Also, the audio message to be sent is transmitted through the second wireless communication module 201 to the portable communication device 32 such that the audio message received by the portable communication device 32 can be transmitted to the wireless head set 20 to perform bi-direction audio transmission.

The Fourth Preferred Embodiment

Figure 4A:
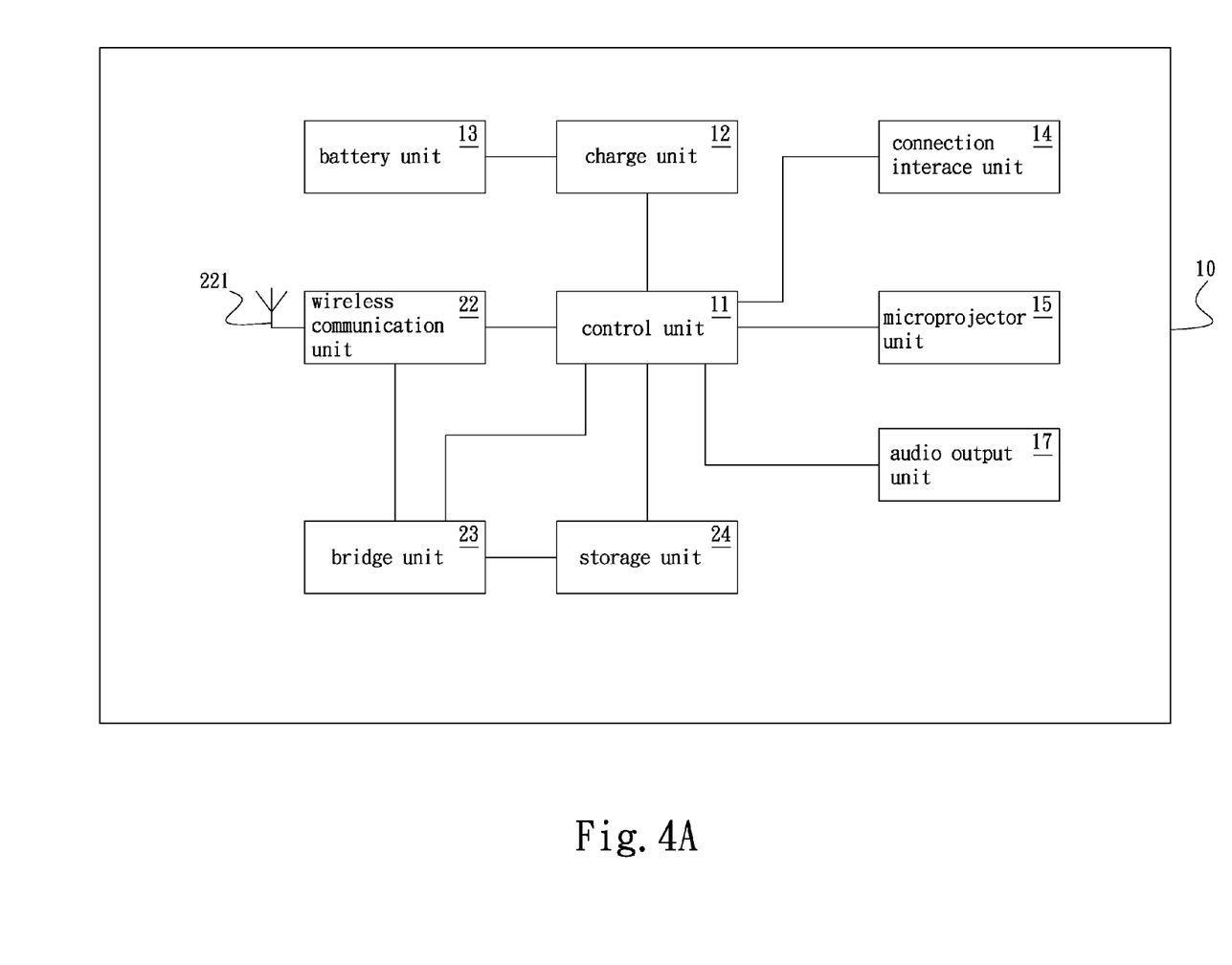
FIG. 4A is a schematic block diagram according to the fourth preferred embodiment of the present invention.

Pleaser refer to FIG. 4A, which is a schematic block diagram of the portable power bank device with a projecting function according to the fourth preferred embodiment of the present invention. As shown in FIG. 4A, some structures of the current embodiment are the same as those of the above-mentioned first embodiment and will not be described again. The difference between the current embodiment and the above-mentioned first embodiment is that in the current embodiment the portable power bank device 10 further comprises a bridge unit 23 electrically connected to the control unit 11 and to the wireless communication unit 22 and a storage unit 24 electrically connected to the bridge unit 23 and to the control unit 11. The bridge unit 23 and the storage unit 24 obtain the battery power source through the control unit 11.

The above-mentioned storage unit 24 is used to store data and is, for example (but not limited to), a NAND Flash memory module consisting of NAND Flash chips. It can be expanded on demand to replace the NAND Flash chips to increase storage capacity. The audio/video data in the storage unit 24 can be encoded/decoded by the video codec 114 and the audio codec 115 of the control unit 11. After that, the encoded/decoded video signals are transmitted to the micro projector unit 15 and the encoded/decoded audio signals to the audio output unit 17 to be output.

The above-mentioned bridge unit 23 allows the data in the storage unit 24 to be accessed according to a remote signal.

Figure 4B:
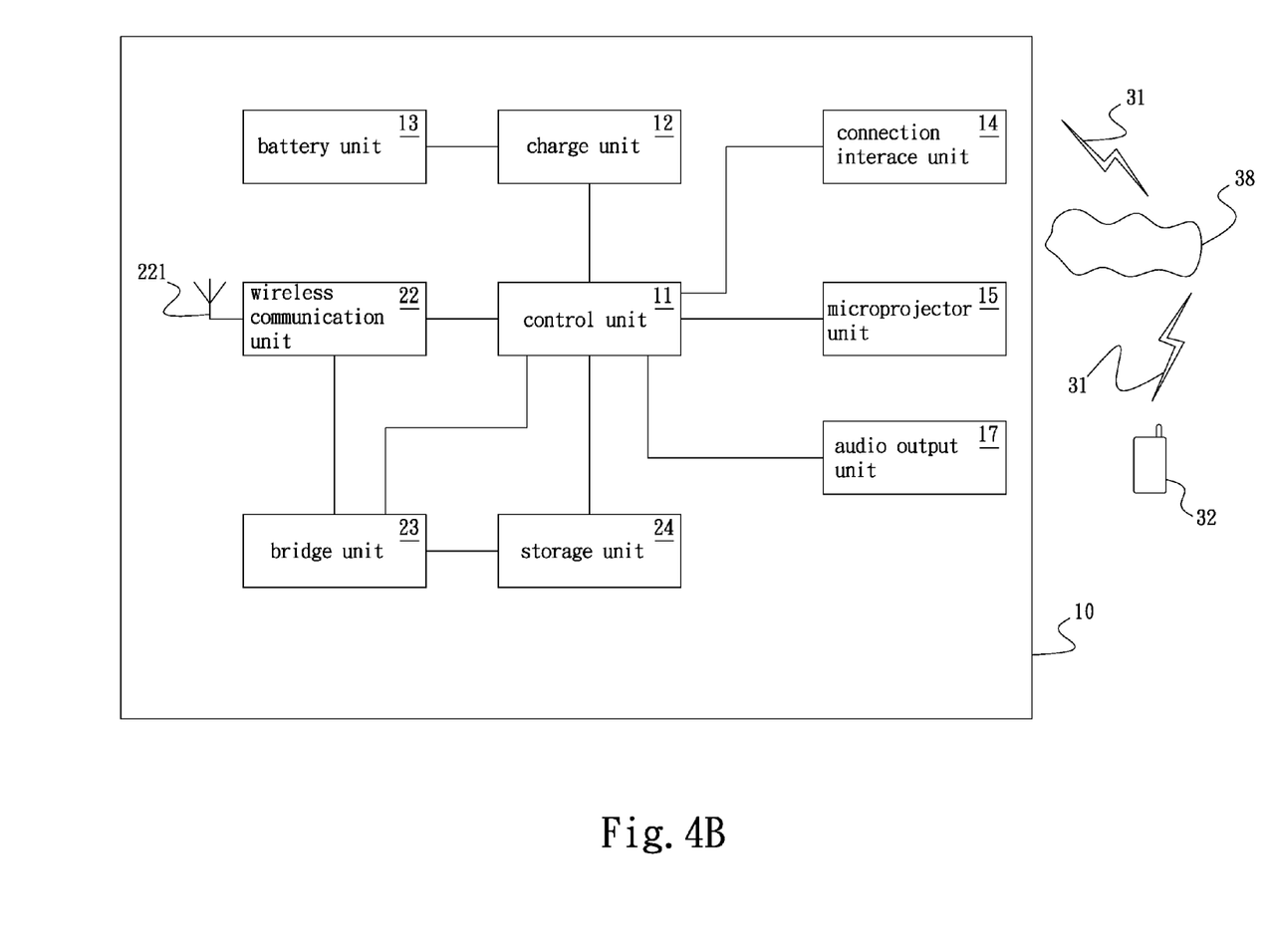
FIG. 4B is an operational schematic according to the fourth preferred embodiment of the present invention.

Please refer to FIG. 4B, which is an operational schematic according to the fourth preferred embodiment of the present invention. A portable device 32, such as an iphone or an Android cell phone, uses wireless signals 31 to establish a wireless connection through Internet 38 with the portable power bank device 10. The wireless signals 31 are transmitted through the antenna 221 of the wireless communication unit 22 and the first wireless communication module 113 of the control unit 11 to the bridge unit 23 and allow the portable device 32 to freely download/upload data from/to the storage unit 24.

The Fifth Preferred Embodiment

Figure 5A:
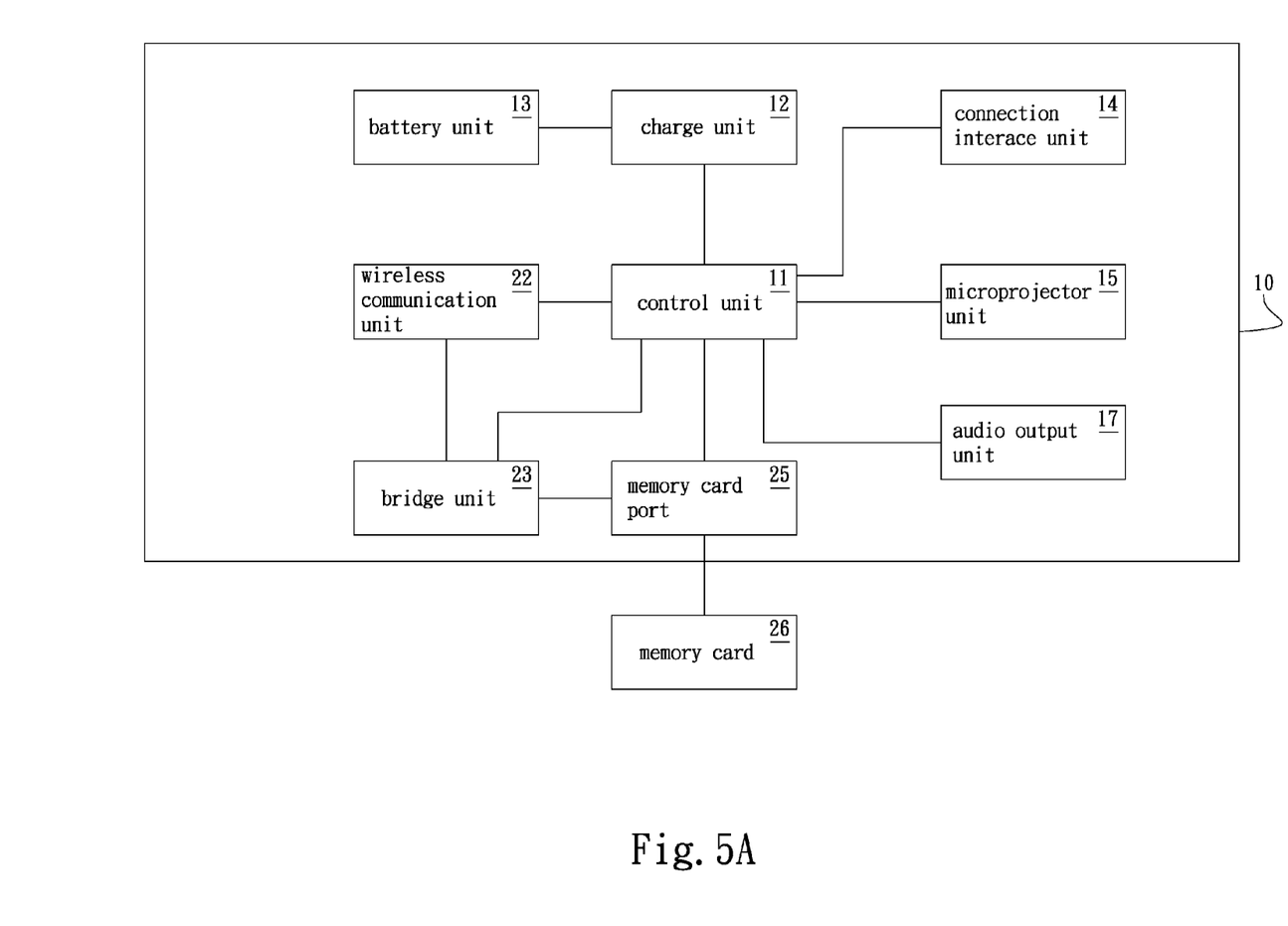
FIG. 5A is a schematic block diagram according to the fifth preferred embodiment of the present invention.

Please refer to FIG. 5A, which is a schematic block diagram of the portable power bank device with a projecting function according to the fifth preferred embodiment of the present invention. As shown in FIG. 5A, some structures of the current embodiment are the same as those of the above-mentioned fourth embodiment and will not be described again. The difference between the current embodiment and the above-mentioned fourth embodiment is that in the current embodiment the storage unit comprises a memory card port 25 inserted by and connected to a memory card 26. The memory card port 25 is connected to the control unit 11 and the bridge unit 23.

The memory card 26 is used to store data and is, for example (but not limited to), a Secure Digital (SD) card, a Near Field Communication (NFC) Card, a Compact Flash (CF) card, a Smart Media card (SMC), a Multi Media card (MMC), or a Memory stick (MS) card.

The audio/video data in the memory card 26 can be encoded/decoded by the video codec 114 and the audio codec 115 of the control unit 11 through the memory card port 25. After that, the encoded/decoded video signals are transmitted to the micro projector unit 15 and the encoded/decoded audio signals to the audio output unit 17 to be output.

The above-mentioned bridge unit 23 allows the data in the memory card 26 to be accessed according to a remote signal.

Figure 5B:
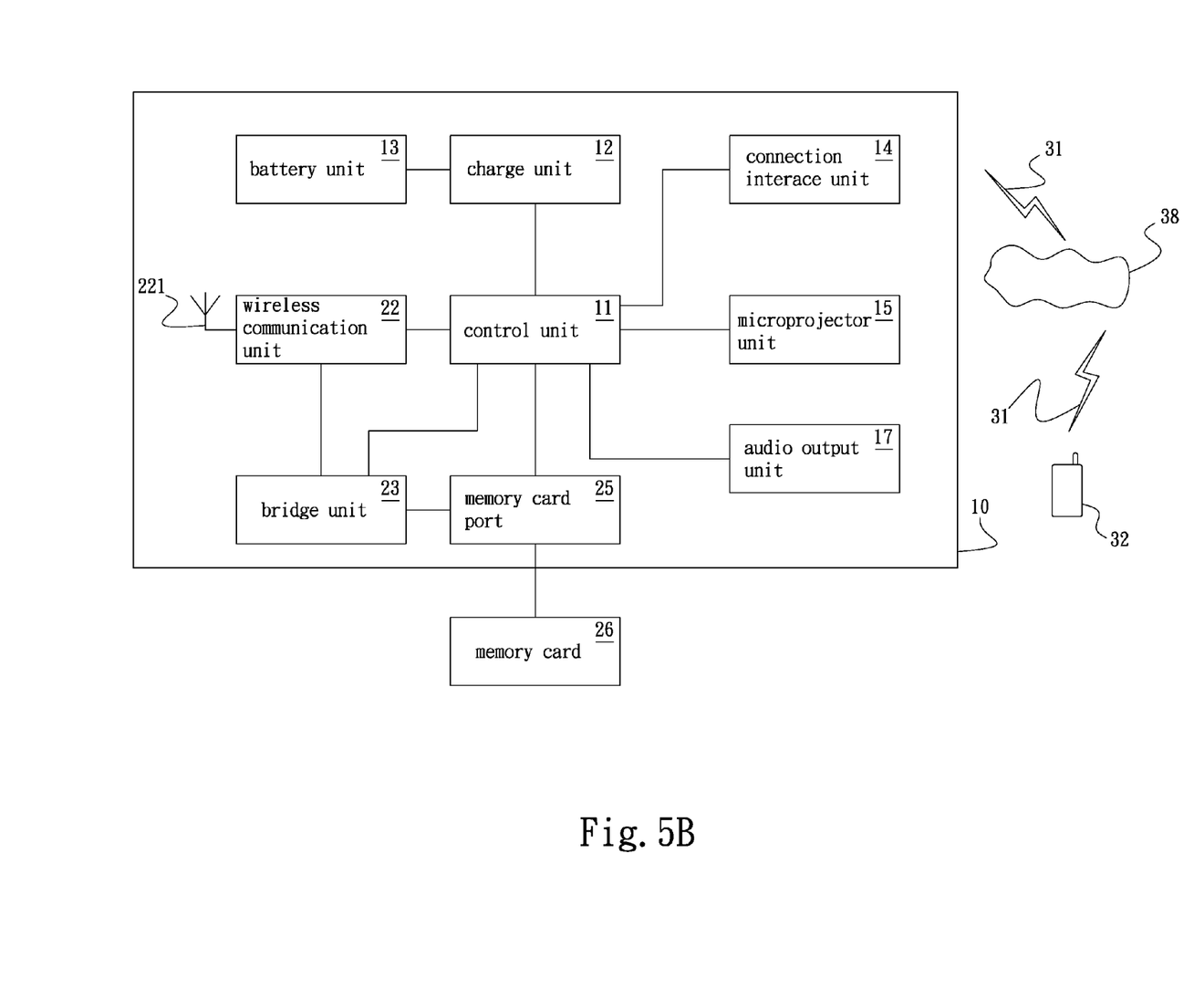
FIG. 5B is an operational schematic according to the fifth preferred embodiment of the present invention.

Please refer to FIG. 5B, which is an operational schematic according to the fifth preferred embodiment of the present invention. A portable device 32, such as an iphone or an Android cell phone, uses a wireless signal 31 to establish a wireless connection with the portable power bank device 10 through Internet. The wireless signal 31 is transmitted through the antenna 221 of the wireless communication unit 22 and the first wireless communication module 113 of the control unit 11 to the bridge unit 23 and allows the portable device 32 to freely download/upload data from/to the memory card 26.

The embodiments of the present inventions are disclosed above; however, they are not intended to limit the present invention. Any person skilled in the art can make any change and modification without escaping the scope and spirit of the invention. Therefore, the protection scope of the invention is defined by the appended claims.

What is claimed is:

1. A portable power bank device with a projecting function, comprising:
    a battery unit electrically coupled to a charge unit and restoring power from an external power source;
    a control unit electrically coupled to the charge unit and a connection interface unit, the control unit comprising a charge module, a voltage conversion module, a video codec, and a first wireless communication module, the connection interface unit connected to the external power source or an external device with a battery, the voltage conversion module detecting a voltage current of the battery of the external device, the battery unit outputting a battery power source through the voltage conversion module;
    a micro projector unit electrically coupled to the control unit and projecting and displaying video signals of the video codec; and
    a wireless communication unit electrically coupled to the first wireless communication module of the control unit and receiving a wireless signal;
    a bridge unit electrically connected to the control unit and to the wireless communication unit;
    a storage unit electrically connected to the bridge unit and to the control unit;
    wherein a power of the battery of the external device is recharged by the battery power source of the battery unit through the connection interface unit when the voltage current of the battery of the external device is weak and an image of an interface screen or an internal data of the external device is projected on a display surface via the micro projector unit of the portable power bank device;
    wherein the bridge unit and the storage unit obtain power from the battery power source through the control unit, the storage unit is used to store data, the bridge unit allows the data in the storage unit to be accessed according to a remote signal from the external device; and
    wherein the voltage conversion module which is used for conversion of a source voltage comprises an overload protection submodule avoiding an excessive transmission current and a detection submodule detecting a voltage current of an electronic device.

2. The portable power bank device with the projecting function according to claim 1, wherein the connection interface unit comprises a USB interface, an HDMI interface, an AV out interface, and a TV out interface.

3. The portable power bank device with the projecting function according to claim 1, wherein the first wireless communication module having an AP submodule and a client submodule.

4. The portable power bank device with the projecting function according to claim 1, wherein the wireless signal is the signal of Bluetooth, Hyper LAN, Triple Play, GSM/GPRS, 3G, 3.5G, 4G, IEEE802.11, IEEE802.3, IEEE802.15, and/or Wi-Fi Direct.

5. The portable power bank device with the projecting function according to claim 1, wherein the first wireless communication module has an antenna.

6. The portable power bank device with the projecting function according to claim 1, wherein the wireless communication unit is a communication unit of WIFI, 3G, 4G, and/or Bluetooth.

7. The portable power bank device with the projecting function according to claim 1, wherein the control unit further comprises an audio codec having a 3D sound effect submodule.

8. The portable power bank device with the projecting function according to claim 7, further comprising an audio output unit including an amplifying element and a speaker element, wherein the audio output unit is connected to the audio codec of the control unit.

9. The portable power bank device with the projecting function according to claim 1, further comprising a phone set connected to the control unit.

10. The portable power bank device with the projecting function according to claim 1, further comprising an accommodating unit electrically connected to the control unit and accommodating a wireless head set which can be extracted out of the accommodating unit, wherein the wireless head set has a second wireless communication module.

11. The portable power bank device with the projecting function according to claim 1, further comprising:
    a bridge unit electrically coupled to the control unit and to the wireless communication unit; and a storage unit electrically coupled to the control unit and to the bridge unit.

12. The portable power bank device with the projecting function according to claim 11, wherein the storage unit is a NAND memory.

13. The portable power bank device with the projecting function according to claim 11, wherein the storage unit comprises a memory card port inserted by and connected to a memory card.

14. The portable power bank device with the projecting function according to claim 13, wherein the memory card is a Secure Digital (SD) card, a Near Field Communication (NFC) Card, a Compact Flash (CF) card, a Smart Media card (SMC), a Multi Media card (MMC), or a Memory stick (MS) card.

* * * * *